(12) United States Patent
Puzrin et al.

(10) Patent No.: US 10,060,249 B2
(45) Date of Patent: Aug. 28, 2018

(54) METHOD AND DEVICE FOR MEASURING PRESSURE EXERTED BY EARTH MATERIAL

(71) Applicant: ETH Zurich, Zurich (CH)

(72) Inventors: Alexander Puzrin, Zurich (CH); Markus Schwager, Zurich (CH); Andreas Schmid, Visp (CH); Ernst Bleiker, Bergdietikon (CH)

(73) Assignee: ETH Zurich, Zurich (CH)

( * ) Notice: Subject to any disclaimer, the term of this patent is extended or adjusted under 35 U.S.C. 154(b) by 304 days.

(21) Appl. No.: 14/896,007

(22) PCT Filed: Jun. 4, 2014

(86) PCT No.: PCT/EP2014/061560
§ 371 (c)(1),
(2) Date: Dec. 4, 2015

(87) PCT Pub. No.: WO2014/195348
PCT Pub. Date: Dec. 11, 2014

(65) Prior Publication Data
US 2016/0123136 A1   May 5, 2016

(30) Foreign Application Priority Data

Jun. 5, 2013 (EP) ..................................... 13002910

(51) Int. Cl.
*E21B 47/08* (2012.01)
*E21B 47/04* (2012.01)
(Continued)

(52) U.S. Cl.
CPC ............ *E21B 47/08* (2013.01); *E21B 47/011* (2013.01); *E21B 47/04* (2013.01); *G01B 7/13* (2013.01); *G01B 7/16* (2013.01)

(58) Field of Classification Search
CPC ........ E21B 47/04; E21B 47/08; E21B 47/011; G01B 7/13; G01B 7/16
(Continued)

(56) References Cited

U.S. PATENT DOCUMENTS 3,727,126 A     4/1973 Kiselman et al.
3,796,091 A *   3/1974 Serata ..................... E02D 1/022
                                                73/779

(Continued)

FOREIGN PATENT DOCUMENTS

CN          2641587 Y  *  9/2004  ............... G01B 5/04
DE     202004002121 U1    12/2004
(Continued)

*Primary Examiner* — R. A. Smith
(74) *Attorney, Agent, or Firm* — The Webb Law Firm

(57) ABSTRACT

A method for measuring pressure exerted by earth material includes: providing a pipe with a longitudinal bore defining an inner diameter, providing a device with sensors to sense said inner diameter, wherein the device is to be moved within the pipe along the longitudinal bore, while a measurement of the inner diameter is taken in a first transversal direction at one longitudinal position of the pipe. Then a measurement of the inner diameter in a second transversal direction at the predetermined longitudinal position is taken, wherein the second transversal direction is oriented differently to the first transversal direction. Finally, an ovalization of the pipe is derived at that predetermined longitudinal position of the pipe through subtracting a diameter value of the first transversal direction from a diameter value of the second transversal direction.

13 Claims, 14 Drawing Sheets

(51) Int. Cl.
*G01B 7/13* (2006.01)
*G01B 7/16* (2006.01)
*E21B 47/01* (2012.01)

(58) Field of Classification Search
USPC ...... 33/543, 544; 73/152.02, 152.43, 152.51, 73/152.52, 152.53
See application file for complete search history.

(56) References Cited

U.S. PATENT DOCUMENTS

| | | | | |
|---|---|---|---|---|
| 3,882,606 A | * | 5/1975 | Kaenel et al. ......... | G01B 7/281 33/544 |
| 3,940,855 A | * | 3/1976 | Ver Nooy et al. ..... | G01B 7/281 33/544 |
| 5,272,916 A | * | 12/1993 | Blauch et al. .......... | E21B 47/08 166/250.1 |
| 7,698,937 B2 | | 4/2010 | Neidhardt | |
| 2005/0283315 A1 | | 12/2005 | Haugland | |

FOREIGN PATENT DOCUMENTS

| | | | | |
|---|---|---|---|---|
| GB | 2054857 A | | 2/1981 | |
| JP | 05280917 A | * | 10/1993 | ............... G01B 7/28 |
| JP | 2012032330 A | | 2/2012 | |
| WO | 96/13699 A2 | | 5/1996 | |
| WO | 2008/127237 A1 | | 10/2008 | |
| WO | 2009/056853 A1 | | 5/2009 | |

* cited by examiner

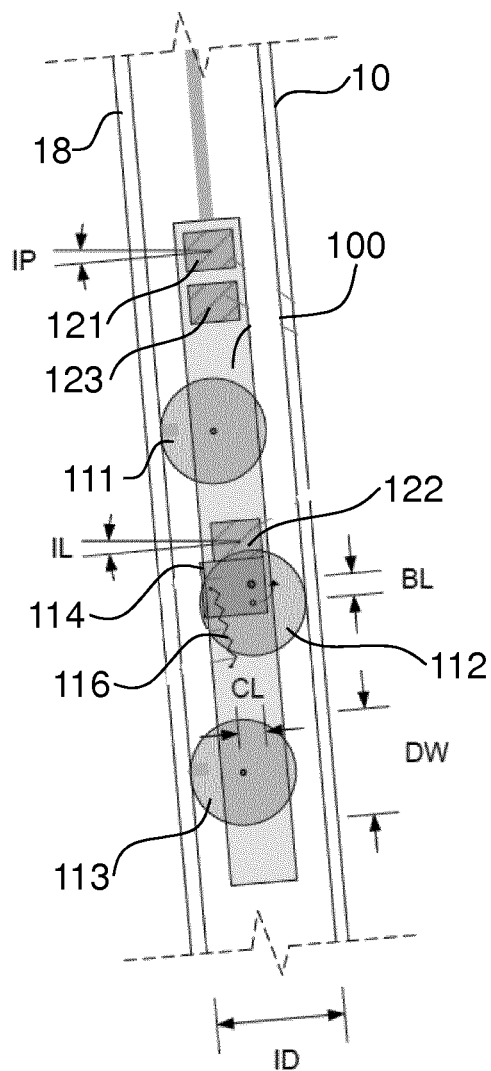
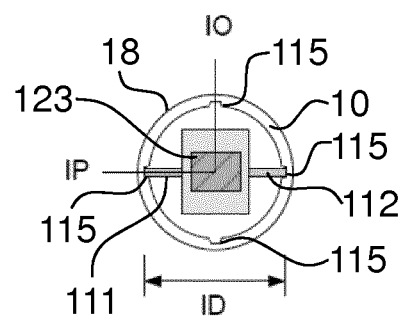
FIG. 2B
FIG. 2A

METHOD AND DEVICE FOR MEASURING PRESSURE EXERTED BY EARTH MATERIAL

CROSS-REFERENCE TO RELATED APPLICATIONS

This application is the United States national phase of International Application No. PCT/EP2014/061560 filed Jun. 4, 2014, and claims priority to European Patent Application No. 13002910.1 filed Jun. 5, 2013, the disclosures of which are hereby incorporated in their entirety by reference.

TECHNICAL FIELD

The invention relates to a method and device for measuring pressure exerted by earth material.

PRIOR ART

Lateral earth pressures are a source for many practical problems in geotechnical engineering. Usually so called inclinometer pipes are installed in a vertical borehole in soil for measuring soil displacements.

WO 2008/127237 from Halliburton shows a device using a control unit with a computer program for monitoring the data of a drill diameter. The ellipticity of the bore hole is measured as an indication of formation stress.

JP 2012-032330 shows a penetration type pipe strain meter wherein within a hollow tube a plurality of strain gauges are attached at an inner pipe member but inside the outer pipe member.

WO 2009/056853 provides methods for detecting strain in pipe-like chambers in the circumference direction.

U.S. Pat. No. 7,698,937 provides an apparatus for detecting irregularities within a pipe and discloses specific strain gauges at opposite elements of a pipe.

DE 20 2004 002 121 discloses a rotating device taking the inner form of a tube portion.

SUMMARY OF THE INVENTION

Based on the prior art it is an object of the invention to provide a more simple measurement method allowing to derive a dimensionless value indicating the formation of stress in the vicinity of a bore in the ground, especially around a pipe.

A method for measuring pressure exerted by earth material, comprises the steps of: providing a pipe in the earth material, wherein the pipe has a longitudinal bore defining an inner diameter of the pipe, providing a device adapted to be moved within the pipe along the longitudinal bore, wherein the device comprises sensors adapted to sense the inner diameter of the pipe. Then the device is moved along the pipe and a measurement of the inner diameter of the pipe is taken in a first transversal direction at at least one predetermined longitudinal position of the pipe. Then a measurement of the inner diameter of the pipe in a second transversal direction at at least one predetermined longitudinal position of the pipe is taken, wherein the second transversal direction is oriented differently to the first transversal direction. Finally, the ovalizaion of the pipe is derived at that predetermined longitudinal position of the pipe through subtracting the diameter value of the first transversal direction from the diameter value of the second transversal direction. In this context it is noted that the prior art WO 2008/127237 uses the wording ellipticity. This might be correct for a bore hole. Here, in the case of a deformed pipe, the form is an oval and not an ellipse, therefore the deformation is named ovalization.

In an embodiment of the invention the first transversal direction is oriented perpendicular to the second transversal direction. In a different embodiment, there are two or more further transversal directions oriented each in an angle to each other transversal direction.

IDM is used throughout the application as acronym for inclinodeformometer or inclinodeformeter.

Such a pipe can be one hollow cylinder or a sequence of sections of hollow cylinders. The pipe can be an inclinometer pipe, especially comprising two or more pairs of inside guiding channels for guiding the probe.

According to one method, the measurements of the diameter value at the different transversal directions are fitted to a theoretical oval of the pipe providing the best fit at a specific longitudinal position. Then it is possible to correct the ovalization value for an inclination of the pipe, wherein the device furthermore comprise at least one inclination sensor to determine the specific inclination of the device and the pipe at any longitudinal position of the device. In this respect, the correcting of the ovalization value for inclination of the pipe can be calibrated based on the inclination at a specific section of the pipe.

Furthermore it is an object of the invention to provide a simpler method for obtaining changes of lateral pressure along a pipe provided essentially vertically in the ground.

It is a further object of the invention to provide a simpler device and probe for execution of said method.

Such a probe device according to the invention, adapted to execute a method for measuring pressure exerted by earth material around a pipe as mentioned above comprises: a longitudinal frame comprising an attachment for a cable intended to displace the probe device within a pipe along its longitudinal bore, at least a sensor adapted to sense the inner diameter of the pipe, at least a further sensor adapted to determine the longitudinal position of the probe device in the pipe, and a control unit connected with the sensors, wherein the device is adapted to take a measurement of the inner diameter of the pipe in a first transversal direction at at least one predetermined longitudinal position of the pipe and to take a measurement of the inner diameter of the pipe in a second transversal direction at at least one predetermined longitudinal position of the pipe, wherein the second transversal direction is oriented differently to the first transversal direction, and wherein the control unit is adapted to derive the ovalization of the pipe at that predetermined longitudinal position of the pipe through subtracting the diameter value of the first transversal direction from the diameter value of the second transversal direction.

Within an embodiment of the invention the probe comprises three wheels along its longitudinal axis, wherein the upper and the lower wheel are attached rotatably at a frame of the probe device and which is connected to the cable and wherein the middle wheel is attached on a movable axis being parallel to the axis of the other two wheels.

The sensors providing the diameter of the probe device can be tilt sensors. The sensor providing the longitudinal position of the probe device can be a rotation sensor provided at a cable pulling wheel.

Such a device is adapted to measure the deformations of the cross-section of an inclinometer pipe, which are used for back-calculation of earth pressures acting close to the pipe.

The pressure changes with depth $CP(z)$ are back-calculated solving the corresponding boundary value problem given in a horizontal cross-section at each predetermined longitudinal position. The change in pressure at each predetermined longitudinal position is obtained from the change in the static boundary condition, which has to be applied in order to reproduce the measured pipe deformations. This results in a value representing the change in lateral pressure CP, being defined as the major principle lateral stress increment in the surrounding ground, which is derived from the change in ovalization value applying an analytical solution based on elasticity theory based on the formula: $CP=YG*(1+alpha)/(8*(1-SR)*\cos(2*DS))*COV$ with $alpha=3\ YP*IP*(5-PG)/(RP^3*YG)$, wherein YP is Young's modulus of the pipe and is YG Young's modulus of the ground, SR is the stress ratio in between the principle stress increments in the plane at infinity, COV is the change in ovalization value, PG is Poisson's ratio of the ground. RP is the mean radius of the pipe, IP is the circumferential cross-section moment of inertia of the pipe, DS is the angle between the direction of the major principle stress increment and the direction of the minor axis of the equivalent oval, wherein the stress ratio SR of the principle stress increments is defined by dividing the minor principle stress increment by the major principle stress increment, wherein through assumption of the constrained boundary conditions at infinity in direction of the minor principle stress increment the ratio SR of principle stress increments is considered equal to the Poisson's ratio of the ground PG. Such a method can further comprise the determination of the angle DS obtained through measurement of the horizontal displacement of the ground HD based on the assumption that the major principle stress increment occurs in direction of the horizontal displacement of the ground HD.

SHORT DESCRIPTION OF THE DRAWINGS

Preferred embodiments of the invention are described in the following with reference to the drawings, which are for the purpose of illustrating the present preferred embodiments of the invention and not for the purpose of limiting the same. The drawings show FIG. 1 is a conceptual diagram illustrating the principle of IDM pressure measurements.

FIG. 2A & 2B illustrate the probe being part of the measurement apparatus in a pipe.

DESCRIPTION OF PREFERRED EMBODIMENTS

Figure 1:
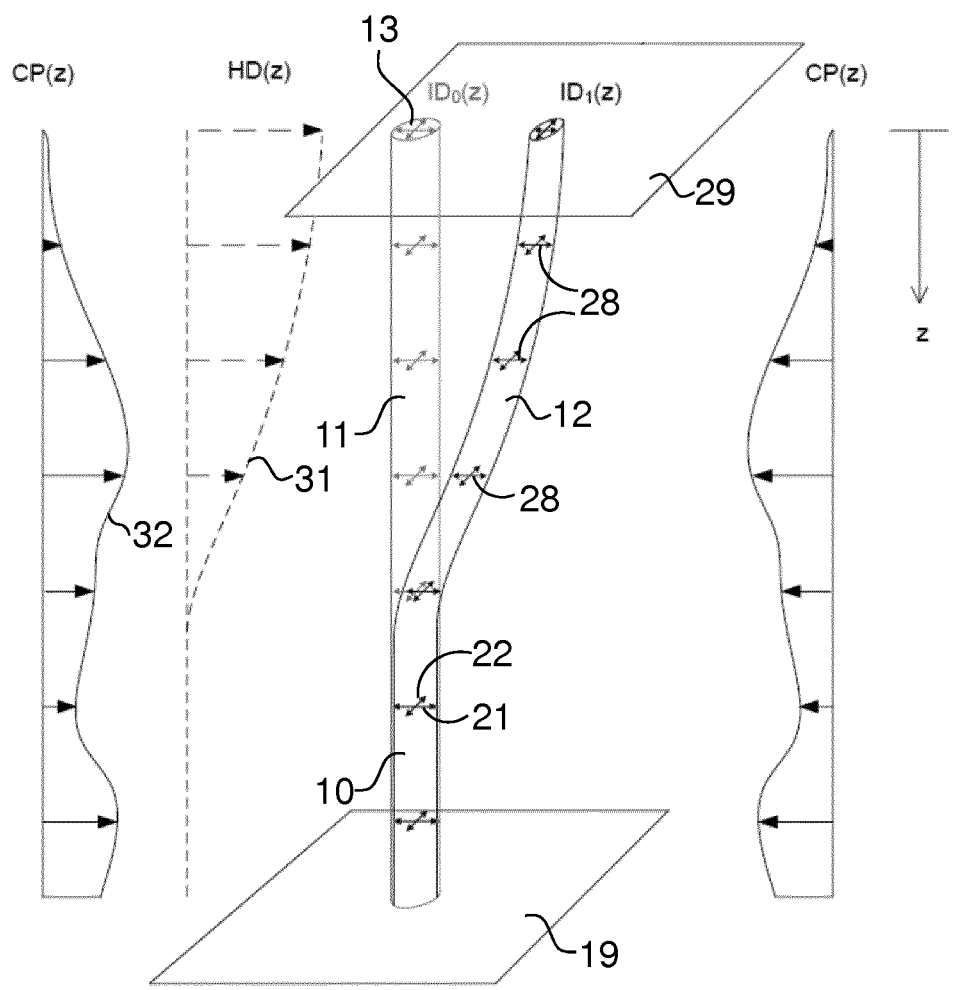

FIG. 1 shows a conceptual diagram illustrating the principle of IDM pressure measurement. A pipe 10 is shown based on a horizontal section 19 through the ground which explains that the pipe 10 is oriented essentially vertical. The usual length of the pipe 10 can be in the range from 1 m to 300 m for geotechnical engineering and in the range from 100 m to 10000 m for petroleum engineering. The diameter 21, 22 of the pipe 10 is preferably in the range from 5 cm to 30 cm for geotechnical engineering and in the range from 10 cm to 100 cm for petroleum engineering. The wall thickness 18 of the pipe can be between less than 1 millimeter and more than 3 centimeters, depending on the material, chosen for the pipe 10. Then there is a sufficient inner lumen 13 to receive the probe 100 as explained below. Usually the pipe 10 is made of plastic, e.g. PVC. Of course the diameters 21 and 22 being one perpendicular to the other in a plane parallel to the shown section 19 are equal in the case that no forces are exerted on the initially cylindrical pipe 10, wherein cylindrical is meant to have a circle as cross section (the mathematical definition of a cylinder is broader).

The term "ID(z)" is used for the inner diameters of the pipe measured by IDM. $ID_0$ relates to the undisturbed pipe 11 between the ground surface 29 and the lower section plan 19, whereas $ID_1$ relates to a pipe 12 under stress. The different measurements are e.g. taken at different height positions 28 between ground 29 and the lower end plan 19.

The curve HD(z) relates to the horizontal displacement 31 of the pipe 10, 12 measured by conventional inclinometers.

The curve CP(z) relates to the change in lateral pressure 32 back-calculated by IDM in the shown direction. The curve CP(z) corresponds to the principle change in stress which may be assumed co-axial with the displacement vector HD(z). From this change in normal stress any other direction can be derived.

FIG. 2A and 2B illustrates the probe 100 being part of the measurement apparatus and the following relates to a detailed description of the design of the measurement apparatus. FIG. 2A shows a schematical cross-section through a pipe 10 and a probe 100 and FIG. 2B shows a view from above onto the probe 100 in the pipe 10.

The IDM probe 100 is being lowered down the pipe 10 on three wheels 111, 112 and 113 preferably guided along channels 115 of the pipe 10 as shown in FIG. 2B. The pipe 10 has a wall 18 of a defined in longitudinal sections essentially uniform thickness. In the wall 18 are provided four longitudinal slits 115 oriented in the main direction of the pipe 10 and being separated by 90 degrees. It is also possible that there are e.g. three slits 115 in 120 degrees distance, or six or eight in regular (60 degrees, 45 degrees) intervals.

The upper and the lower wheels 111 and 113 are fixed on the body of the probe 100 and are rolling in the same channel 115. These wheels 111 and 113 are fixed at their center to the probe 100 for free rotation about an axis perpendicular to the main longitudinal axis of the probe 100. The middle wheel 112 is connected via a lever 114 attached for rotation about an axis parallel to the axes of wheels 111 and 113 same to the body of probe 100, where two springs 116 urge the wheel 113 against the opposite channel 115 in this case of four channels. The same would be true for six or eight channels, for three channels, the wheel 113 would simply contact the wall 18.

A change in the diameter of the pipe 10 leads to a change of the position of the middle wheel 112 in respect to the probe 100. There are two tilt sensors 121 and 122 attached at the body of the probe 100 to measure the inner diameter of the pipe: One sensor 121 is located on the top of the probe 100 detecting the inclination IP of the probe 100; another tilt sensor 122 is located on the lever of the middle single wheel detecting the inclination IL of the lever 114. The inner diameter ID of the pipe 10 is a function of the relative inclination IL-IP. The base distance BL of the lever 114 is given by the distance from the center of rotation of the lever 114 to the center of rotation of the middle wheel 112. The center of rotation of the lever 114 is located in a distance CL from the line connecting the centers of rotations of the upper and the lower wheel 111 and 113.

The inner diameter ID is calculated as the sum of the diameter DW of the wheels, the distance CL, describing the location of the center of rotation of the lever 114, and the base distance BL of the lever 114 multiplied by the sinus of the relative inclination IL-IP.

$$ID=DW+CL+BL*\sin(IL-IP)$$

In addition to the two sensors 121 and 122 in plane of the measured diameter, there is another tilt sensor 123 measuring the inclination IO of the probe 100 in a perpendicular direction out of the plane. This sensor 123 is used for correction of the measurements due to the out-of-plane inclination of the probe.

Figure 3:
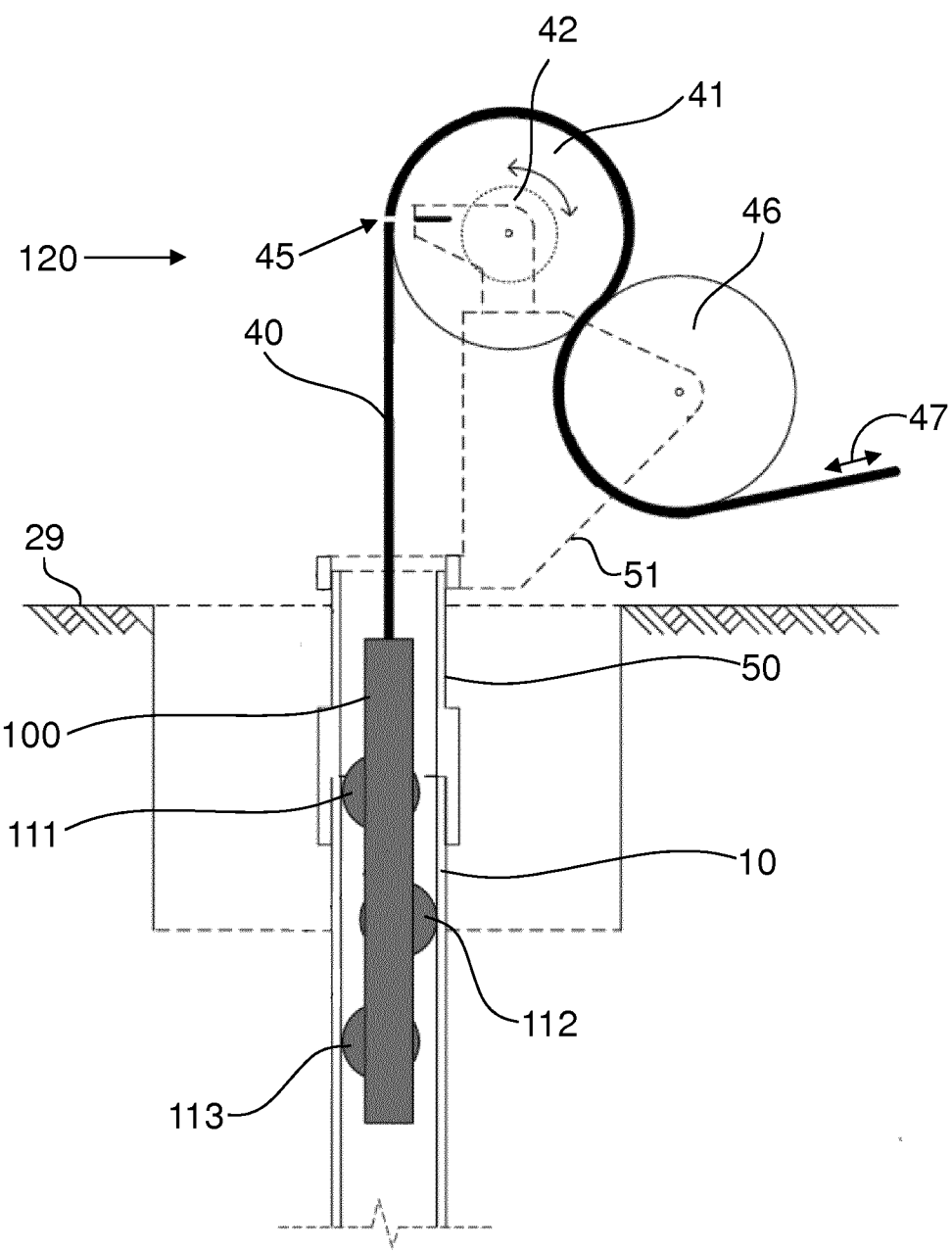
FIG. 3 illustrates the positioning system being part of the measurement apparatus.

FIG. 3 illustrates the positioning system 120 being part of the measurement apparatus. At the top of the borehole, near ground 29, the cable 40 on which the probe 100 is hanging goes around a wheel 41. An incremental rotation sensor (shown as element 42, but mounted on the axle of the wheel 41) measures the wheel rotation, which determines the longitudinal position of the probe 100 in the pipe 10. As the probe 100 is lowered down, all the sensor measurements get saved for the corresponding longitudinal position; the measurements are stored in a computer memory of a control unit (not shown).

A connecting piece 50 of pipe 10 is fixed on top of the inclinometer pipe 10 in order to elongate the pipe 10 above the ground surface 29. A winch 51, here shown as a broken line, is fixed on top of the connecting piece 50. In order to be able to compare measurements it is essential to take reliable and precise measurements of the position of the probe 100.

Therefore corresponding markers 45 on the cable and on the winch could be used to define the starting position of the probe 100 exactly. The position of the probe 100 is recorded relatively to said starting position.

The change in position is measured by the rotation of the winding wheel 41 having the rotation sensor. In order to reach a high precision, slippage of the cable 40 has to be avoided by squeezing it in between the winding wheel 41 and another wheel 46 when a pulling or relieving action is performed on cable 40 along double arrow 47.

Figure 4:
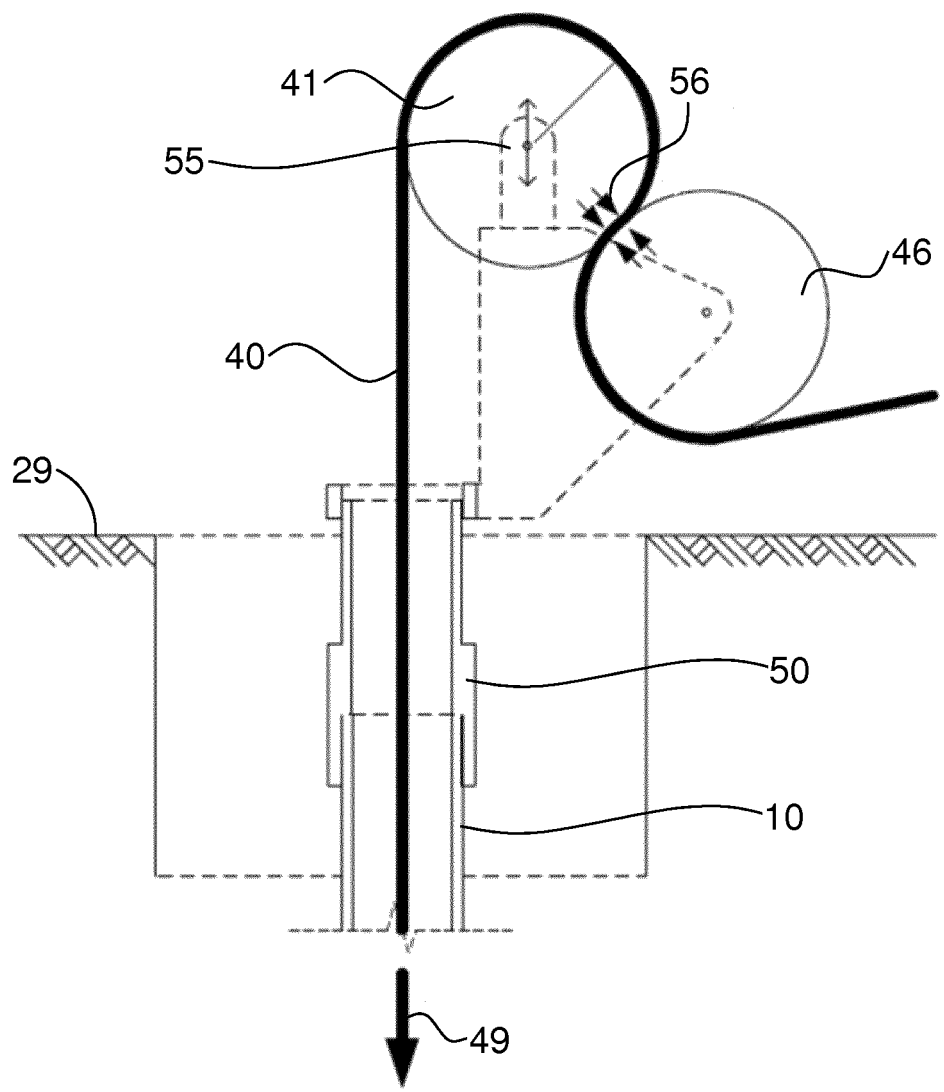
FIG. 4 illustrates features of the positioning system being part of the measurement apparatus.

FIG. 4 illustrates features of the positioning system being part of the measurement apparatus. The center of rotation of the winding wheel 41 is vertically not fixed as shown through arrow 55 at the hub of wheel 41. Therefore the load 49 of the cable 40, being due to the gravity forces acting on the cable and the probe 100, on the winding wheel 41 is used to squeeze the cable 40. The contact pressure where the cable 40 is squeezed is increasing with the length of the winded cable. The friction is adjusted to its need. This squeezing action is shown with arrows 56 directed to the cable 40 between the circumferential surface of wheels 41 and 46.

Figure 5:
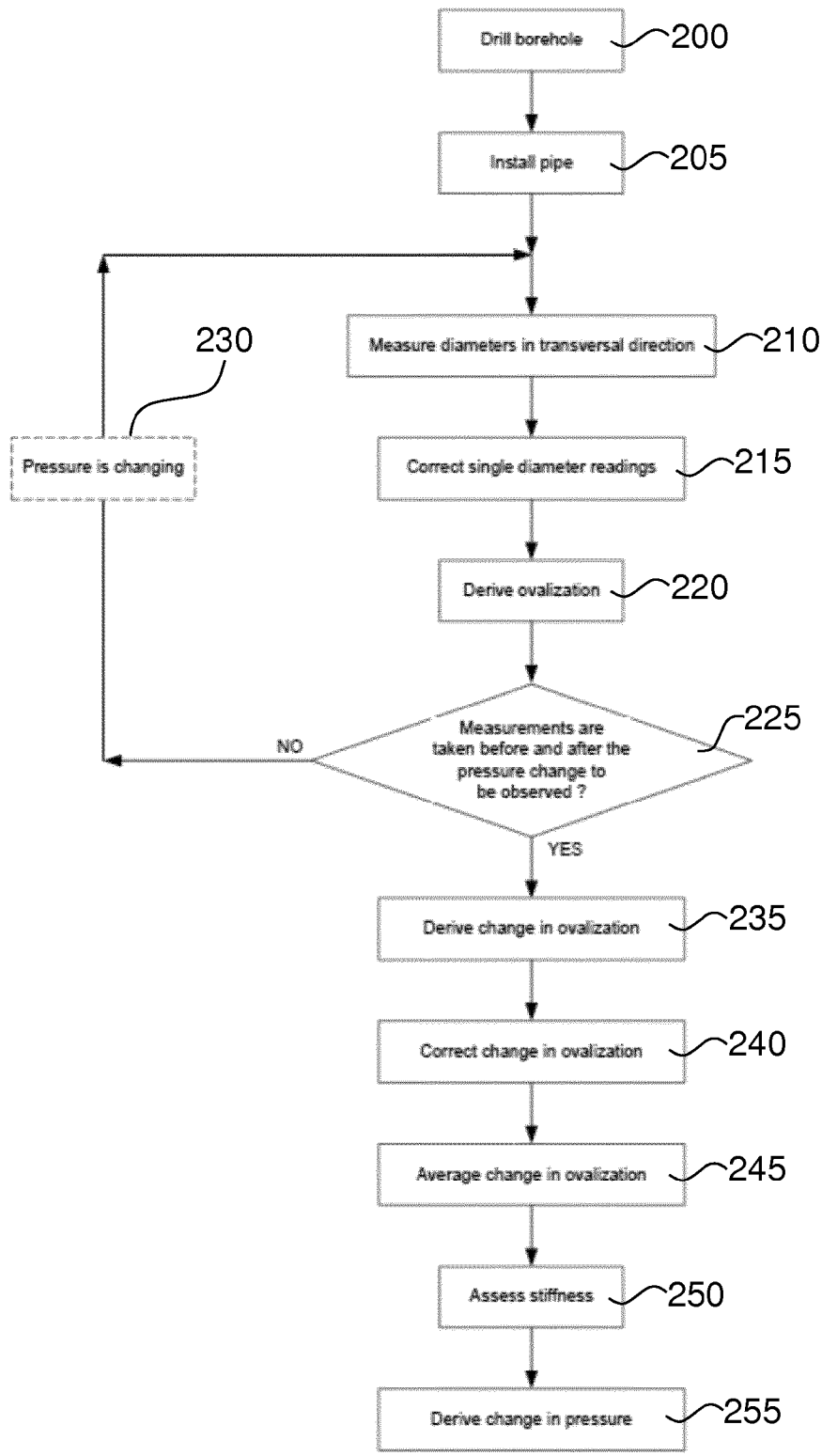
FIG. 5 illustrates a method flow diagram.

FIG. 5 shows a flow diagram of the method according to an embodiment of the invention.

Step 200 is related to "Drilling a borehole". A vertical borehole is drilled into the ground.

Step 205 is related to "Installing a pipe". A pipe 10 is installed along the borehole. The pipe 10 is closed at the bottom of the borehole. At the top of the borehole the pipe 10 can be opened removing the closure head. The borehole is refilled closing the empty space around the pipe 10.

An inclinometer pipe 10 with several pairs of longitudinal inside opposite channels can be installed as the pipe. A standard inclinometer pipe 10 may be installed with two pairs of opposite channels 115 being oriented perpendicular to each other.

The pipe 10 may consist of casing elements connected to each other in the longitudinal direction.

Step 210 is related to "Measuring diameters in transversal direction". Measurements of the inner diameters ID of the pipe are taken in at least two transversal directions at at least one predetermined longitudinal position of the pipe 10. If only two measurements are made at a specific depth of the probe 10 in the shaft, then the two directions are preferably be perpendicular to one another (90 degree interval for the relevant diameter line). It is good to have them perpendicular, but they do not have to be necessarily perpendicular to one another.

More diameter measurements may be taken in different transversal directions (e.g. with regular angular distance of 60, 45, 30 degrees etc., or in unregular intervals) in order to describe better the shape of the pipe 10. More measurements of inner diameters enhance the accuracy of the proposed method.

In case of a standard inclinometer pipe 10, the two perpendicular diameters in the two pairs of channels 115 may be measured. Here reference is made to FIG. 6 relating to data acquisition in such a particular case. Ground 27 is around refill material 17 surrounding the pipe 10. Wall 18 of pipe 10 has two perpendicularly measured diameters ID at the same level.

More diameter measurements may be taken at different predetermined longitudinal positions of the pipe 10 in order to obtain a profile along the pipe 10 or to accumulate more data for a larger base for data reduction. Therefore the probe 100 may be moved along the pipe 10.

Step 215 relates to "Correcting single diameter readings". Every single diameter measurement is corrected from the influence of two errors occurring due to the design of the probe 100. One error (a) is occurring due to the tilt sensors 121, 122 and 123, being not independent of the inclination out of the plane. The other error (b) is occurring because the diameter measured by three wheels 111, 112 and 113 at a certain distance is not equal to the true diameter at one single cross-section of the pipe.

The tilt sensors 121, 122 and 123 are not independent of the inclination out of the plane. It is sufficient to correct the difference (IL-IP) between the measured inclination of the lever IL and the measured inclination of the probe IP in order to correct the diameter. Therefore a correction term CT is subtracted from the difference (IL-IP). The correction term is depending on the inclination of the probe out of the plane IO (FIG. 2), the inclination of the lever IL, the inclination of the probe in the plane IP and the correction coefficients CC1, CC2, CC3, CC4, CC5 and CC6:

$$CT=(CC1*IL+CC2*IP+CC3)*IO^2+(CC4*IL+CC5*IP+CC6)*IO$$

The correction coefficients CC1, CC2, CC3, CC4, CC5 and CC6 are determined by fitting laboratory calibration measurements.

The inner diameter is detected measuring the distance from the middle wheel 112 to the probe 100 as shown in FIG. 2. The probe 100 is guided by the upper 111 and the lower 113 wheel in the opposite channel 115. The probe 100 is describing a straight line in between the upper 111 and the lower 113 wheel. For a straight pipe 10, the straight probe represents very well the opposite channel. The mechanical design of the probe 100 implicates a linear interpolation of the longitudinal shape of the pipe 10 between the upper 111 and the lower 113 wheel.

Figure 8:
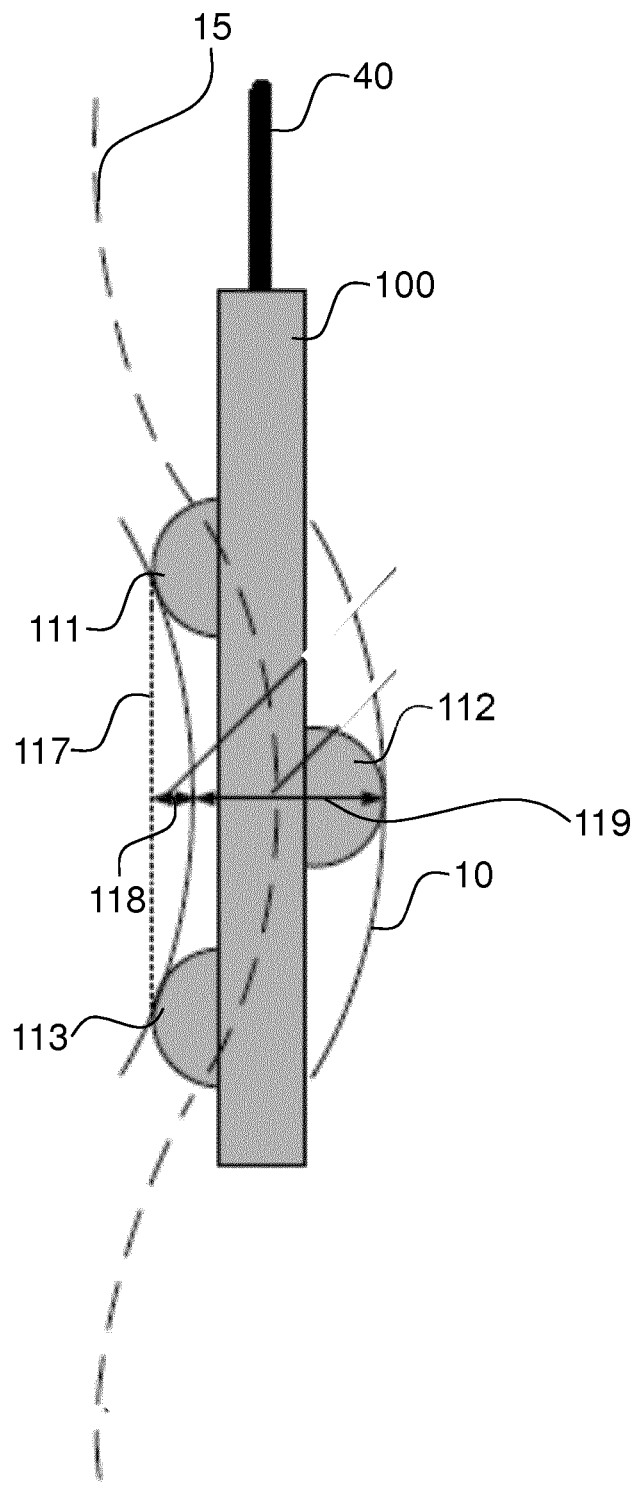
FIG. 8 illustrates data correction.

For a curved pipe 10, the error due to the geometry of the probe 100 is to be corrected. Instead of the linear interpolation, the true curved longitudinal shape of the pipe is taken into account between the upper 111 and the lower 113 wheel as shown in FIG. 8. The pipe 10 is shown extremely exaggerated in order to highlight the error. The middle line 15 is well curved. The connection line 117 between the tangential connection of the two end rollers 111 and 113 creates the assumption of the bottom line for the left inner surface of the pipe 10. However, from the middle wheel 112 to the side line 117 there is the correct diameter 119 and the additional error diameter 118. This difference 118 between the linear interpolation and the curved shape of the pipe 10 at the longitudinal position of the middle wheel 112 is added to the measured diameter.

The curved longitudinal shape of the pipe 10 can be measured using a standard inclinometer probe. Alternatively the IDM measurements can be processed in the same way providing also the longitudinal shape of the pipe 10.

Figure 7:
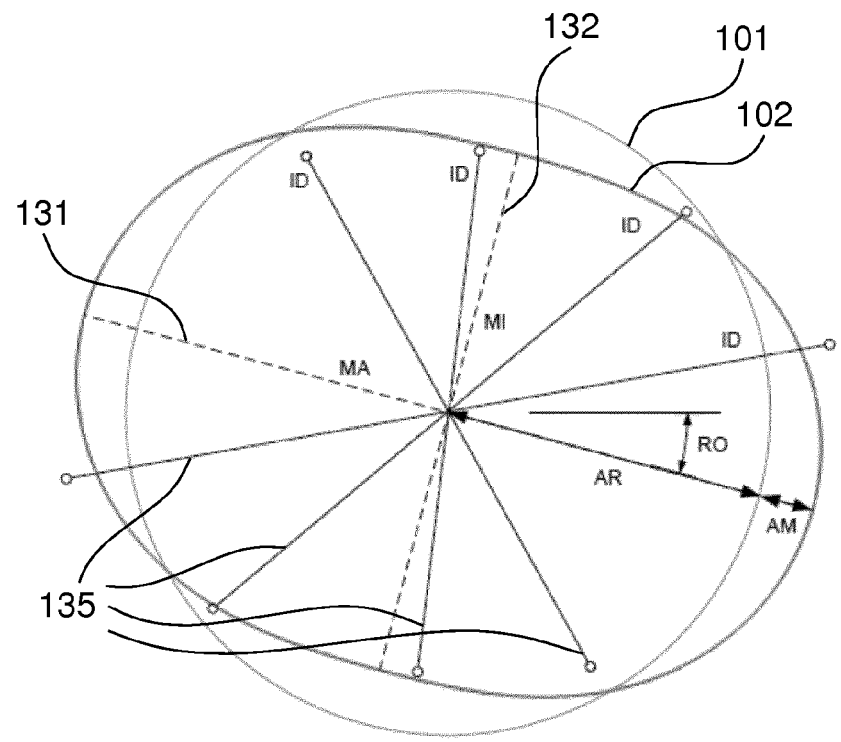
FIG. 7 illustrates data acquisition in a general sense.

Step 220 relates to "Deriving ovalization value". The shape of the pipe 10 shown as a theoretical circle 101 in cross-section is characterized as an oval 102 as seen in FIG. 7, with a major axis 131 length MA and a minor axis 132 length MI, then the ovalization value OV can be determined subtracting the minor axis 132 length form the major axis 131 length and normalizing the difference by the predetermined outer radius 101 of the pipe OR: (MA−MI)/OR. The outer radius 101 of the pipe OR is defined as the nominal outer radius according to the production of the pipe 10. An equivalent oval 102 is found by fitting the plurality of inner diameter measurements 135 in order to obtain the major and minor axis length to derive the ovalization value. In the embodiment according to FIG. 7, four measurements 135 are taken with respective angular distances of 30, 45 and 35 degrees (seen counterclockwise) so that the closing angular distance to the first measurement 135 is 70 degrees (in total 180 degrees as predicted). Due to theoretical considerations the oval is described by an average radius AR, an amplitude AM and a rotation of the oval RO. The radius of the oval 102 deviates from the average radius AR by the amplitude AM times the cosinus of the double rotational coordinate with rotation RO added to the rotational coordinate.

Radius of oval=AR+AM*cos(2*(Rotational Coordinate+RO))

The parameters AR, AM and RO of the equivalent oval are determined by fitting the measured plurality of inner diameters ID. In case of two inner diameter measurements the rotation of the oval RO is assumed to be zero.

The major axis length MA can be determined multiplying the sum of the average radius AR and the amplitude AM by two: 2*(AR+AM). The minor axis length MI can be determined multiplying the difference between average radius AR and the amplitude AM by two: 2*(AR−AM). The ovalization value OV can be calculated multiplying the amplitude AM by the factor of four and dividing it by the outer radius OR: 4*AM/OR.

Figure 6:
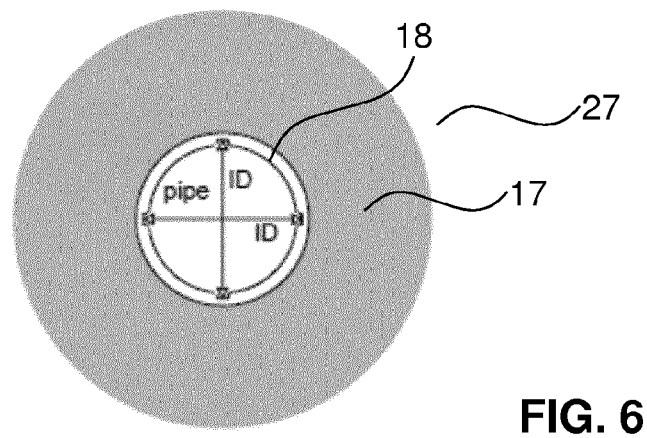
FIG. 6 illustrates data acquisition in a particular case.

In case of two measured perpendicular inner diameters, i.e. when the probe 100 according to FIG. 2A is used in the two directions as provided by the channels 115 in FIG. 2B and measurements are taken similar to FIG. 6, consequently the ovalization value OV can be calculated subtracting the smaller inner diameter ID from the larger inner diameter ID and normalizing the difference by the outer radius OR. This may be the case for a standard inclinometer pipe, where two perpendicular diameters may be measured within the two pairs of channels 115.

The ovalization value is derived for all predetermined longitudinal positions where measurements 28 of inner diameters have been taken, as shown in FIG. 1 in the longitudinal direction of the pipe 10.

The definition of the ovalization value as a normalized difference between the major axis length and the minor axis length allows reducing the influence of errors affecting all the diameter measurements (e.g. influence of the long-term stability of the probe; influence of the actual field conditions: temperature, humidity, water pressures inside and outside of the pipe).

Step 225 relates to the "Obtention of required sets of measurements", i.e. the development over time. The pressure in the ground may change in time. In order to observe the change in pressure the ovalization value has to be determined before and after the period of interest. The reference set of inner diameter measurements is taken before the period of interest. The reference ovalization value OV0 can be derived, i.e. the situation at time $t_0$. At least one consequent set of measurements is taken after the period of interest. A consequent ovalization value OV1 can be derived, i.e. related to the pressure situation at time $t_1$.

As long as the observation period is not enclosed by measurement sets further measurements are to be taken. This is explained by the closing loop step with box 230 having the meaning that possible pressure changes on the pipe 10 can be detected. It is noted that for $t_0$ and for $t_1$ (or $t_2$) values are obtained for at least one, but preferably for a number of measurement depth 28 according to FIG. 1.

Step 235 relates to "Deriving change in ovalization value", i.e. after the time period of taking values. The change of the shape of the pipe 10 in time is characterized by the change in the ovalization value. The change in the ovalization value COV over the observation period is derived subtracting the reference ovalization value from the consequent ovalization value: OV1−OV0.

The change in ovalization value is derived for all predetermined longitudinal positions 28 where measurements of inner diameters ID have been taken.

Step 240 relates to "Correcting change in ovalization value". Change in ovalization does not only occur due to change in pressure in the ground. As a pipe 10 is bent longitudinally its cross-section flattens into an oval shape. The pipe 10 is subjected to bending due to displacements of the surrounding ground, which may not be related to change in pressure. Therefore the change in ovalization can be corrected: The amount of change in ovalization value due to longitudinal bending COVB can be subtracted from the measured change in ovalization value COV.

The change in ovalization value due to bending COVB can be derived from the curvature at the reference measurement CU0, the curvature at the consequent measurement CU1, the outer radius OR of the pipe, the thickness TH of the pipe, the Poisson's ratio of the pipe material PR (being an elastic constant complementary to the Young's modulus) and the angle DC between the direction of the curvature and the direction of the minor axis of the equivalent oval, as follows:

$$COVB=4*(CU1^2-CU0^2)*(OR-TH/2)^5*(1-PR^2)/(OR*TH^2)*cos(2*DC)$$

The curvature at the reference measurement CU0 and the curvature at the consequent measurement CU1 can be found by numerical differentiation of the longitudinal shape of the pipe 10. The curvature may be obtained adding the components of curvature obtained in two directions. The direction of the curvature may be obtained combining the orientation of the two components. The longitudinal shape of the pipe 10 can be measured using a standard inclinometer probe. Alternatively the IDM measurements can be processed in the same way providing also the longitudinal shape of the pipe 10.

In case of an inclinometer pipe with several pairs of longitudinal inside channels, the thickness TH of the pipe may be reduced to take the influence of the channels into account. The thickness of the pipe may be calibrated on numerical simulations considering the real cross-section with channels. The solution for the change in ovalization value due to bending COVB may still be applied as an approximation calibrated on numerical simulations.

Step 245 relates to "Averaging change in ovalization value". The change in ovalization value COV may be obtained at many predetermined longitudinal positions 28 of the pipe 10 forming a profile along the pipe 10. The amount of measured data may provide opportunity for data reduction. The data may be averaged over a certain section along the pipe axes in order to smoothen the profile.

The length of the section for averaging may be taken several times the circumference of the wheels of the probe. Thus the influence of the noise at the frequency of the wheels is reduced.

Figure 9:
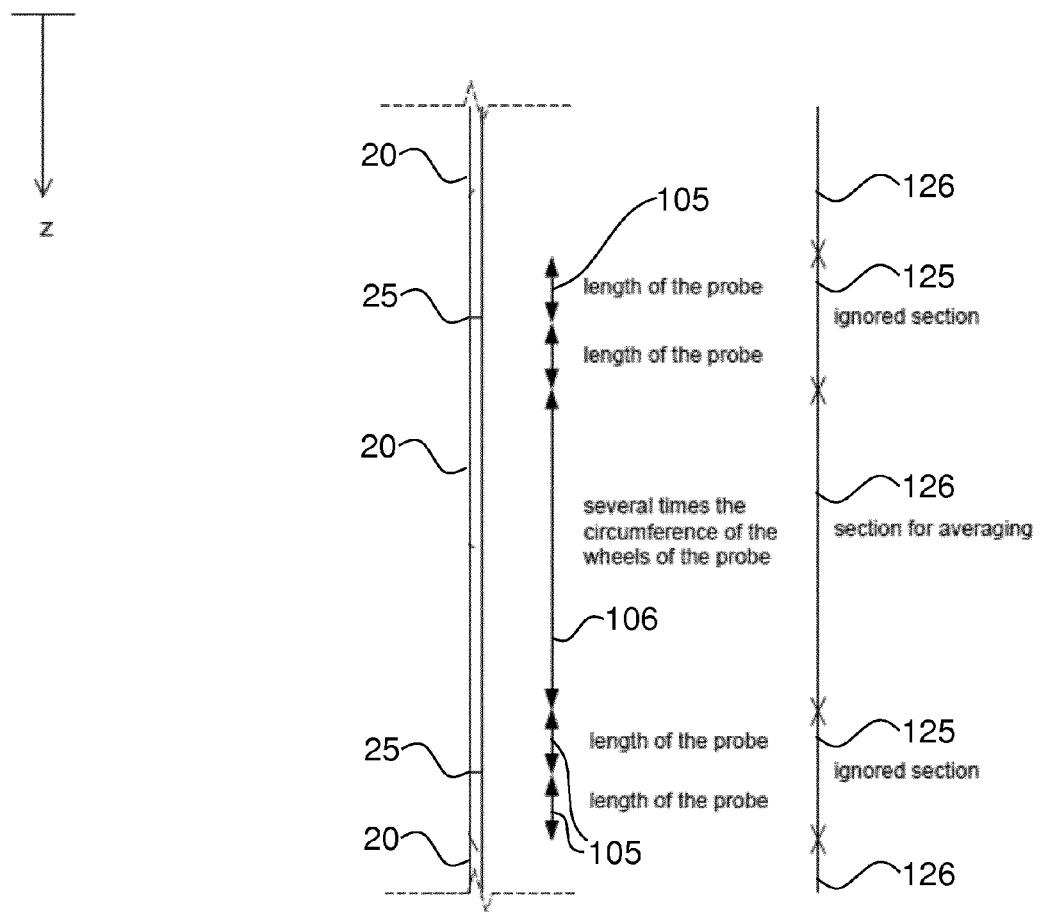
FIG. 9 illustrates data averaging.

FIG. 9 shows the implication of the existence of several sections 20, also named casing elements. In case of a pipe 10 consisting of several casing elements 20, the section of the pipe 10 where the probe 100 is influenced by the joints 25 may be neglected. Hence the sections 105 around the joints 25 adding the length of the probe to both sides may be ignored, being named as ignored sections 125. The obtained change in ovalization value may be averaged within each casing element 20 considering the proposed restrictions within a section for averaging 126. A profile of values describing the change in ovalization may be obtained along the pipe, where each casing element is represented by just one value.

Step 250 relates to "Assessing stiffness". The pressure increment to be observed is related to the change in ovalization via the incremental stiffness of the involved materials (i.e. the pipe material, the material to refill the borehole and the earth material). The incremental stiffness of the involved materials can be expressed via constants of the elasticity theory (e.g. Young's modulus and Poisson's ratio).

The refilling material 17 may be assumed to have the same stiffness than the ground. The stiffness of the ground and of the refilling material may be obtained from standard site investigation and it can be measured in field or laboratory tests or assessed by other means, being well known by someone skilled in the art.

The stiffness of the pipe material may be assessed based on laboratory tests or by other means. The pipe material may show time dependent behavior, which may be taken into account. The stiffness of the pipe for the time step in between the measurement sets may be obtained considering a viscoelastic model (e.g. Burgers model). The analytical solution for the occurring strains with time may be derived assuming the stress conditions with time (e.g. creep conditions or constant stress rate conditions). Dividing the expression for the stress by the expression for the strain at the end of the time step may provide the equivalent stress-independent average stiffness over the time step.

Figure 10:
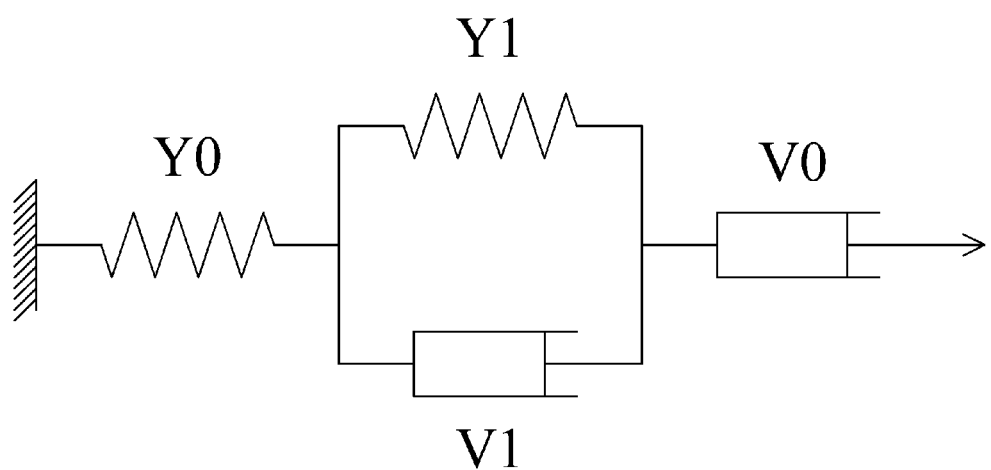
FIG. 10 illustrates the mechanical analog of the Burgers model describing the stiffness of the pipe.

In view of a method to assess the stiffness of the pipe, two formulas to calculate the stiffness of the pipe are provided as mentioned below in connection with FIG. 10: The Young's modulus of the pipe YP is depending the time step TS and on the model parameters, which are the Young's modulus of the spring in series Y0, the Young's modulus of the spring in parallel Y1, the viscosity of the dashpot in series V0 and the viscosity of the dashpot in parallel V1 of the mechanical analog assuming Burgers model (FIG. 10). The Young's modulus of the pipe YP may be calculated assuming constant stress rate conditions, $$YP=1/(1/Y0+1/Y1-V1/(TS*Y1^2)*(1-exp(-Y1/V1*TS))+TS/(2*V0)),$$

or assuming creep conditions:

$$YP=1/(1/Y0+1/Y1*(1-exp(-Y1/V1*TS))+TS/V0)$$

The parameters of the Burgers model Y0, Y0, V0 and V1 can be determined by laboratory tests performed on the pipe material.

Step 255 relates to "deriving change in pressure". The change in lateral pressure in the surrounding ground 17 and 18 can be derived from the change in ovalization value applying an analytical solution based on elasticity theory. The boundary value problem is solved for a horizontal cross-section under generalized plane-stress conditions due to the constant overburden pressure. The change in lateral pressure CP is defined as the major principle stress increment in a horizontal plane at infinity. The change in pressure CP is proportionally depending on the change in ovalization value COV. The change in pressure CP is also depending on the stiffness of the pipe and the ground (i.e. Young's moduli of the pipe YP and of the ground YG, Poisson's ratio of the ground PG), the geometry (i.e. the mean radius of the pipe RP, the circumferential cross-section moment of inertia of the pipe IP), the angle DS between the direction of the major principle stress increment and the direction of the minor axis of the equivalent oval and the stress ratio SR in between the principle stress increments in the plane at infinity:

$$CP=YG*(1+alpha)/(8*(1-SR)*cos(2*DS))*COV$$

with $$alpha=3YP*IP*(5-PG)/(RP^3*YG)$$

The stress ratio SR of the principle stress increments is defined by dividing the minor principle stress increment by the major principle stress increment. Constrained boundary conditions may be assumed at infinity in direction of the minor principle stress increment. Thus, the ratio SR of principle stress increments may be equal to the Poisson's ratio of the ground PG.

The angle DS is depending on the direction of the major principle stress increment in the plane. If the direction of the major principle stress increment is not known, it may be obtained based on the following assumptions:

The major principle stress increment may be assumed to occur in direction of the horizontal displacement of the ground HD. The horizontal displacement of the ground HD can be measured using a standard inclinometer probe 10 as mentioned in connection with FIG. 1. Alternatively, the IDM measurements can be processed in the same way providing also the horizontal displacement of the ground. If more than two inner diameters are measured, the direction of the major principle stress increment may also be assumed according to the deformed shape of the pipe. The major stress direction may coincide with the minor principle axis of the equivalent oval.

In case of an inclinometer pipe 10 with several pairs of longitudinal inside channels 115, the circumferential cross-section moment of inertia of the pipe IP may be reduced to take the influence of the channels 115 into account. The over-all moment of inertia of the pipe IP may be calibrated on numerical simulations considering the real cross-section with channels. The solution for the change in pressure CP may still be applied as an approximation calibrated on numerical simulations.

The change in pressure is derived for all predetermined longitudinal positions where measurements of inner diameters have been taken. In any case there is provided a control unit 170 connected with the sensors 42, 121, 122 for control of the different measurements according to the method according to an embodiment of the invention.

Three different wordings for the conducting tubes 10 are used in the present disclosure. The wording 'pipe' was used for any kind of hollow cylinder. The present method according to the invention is applicable to these pipes/hollow cylinder 10. The term 'inclinometer pipe' was used for a pipe with two or more pairs of channels 115. The probe 100 and the method are applicable to these inclinometer pipes 10. The further term 'Standard inclinometer pipe' was used for a pipe 10 with two pairs of channels 115 perpendicular to each other, which are the current standard of inclinometer pipes. Additionally it is noted that often pipes 10 comprise adapter pieces in sections 125 between pipe sections 126 as e.g. the adapter piece 50. They usually also comprise channels 115.

Figure 11:
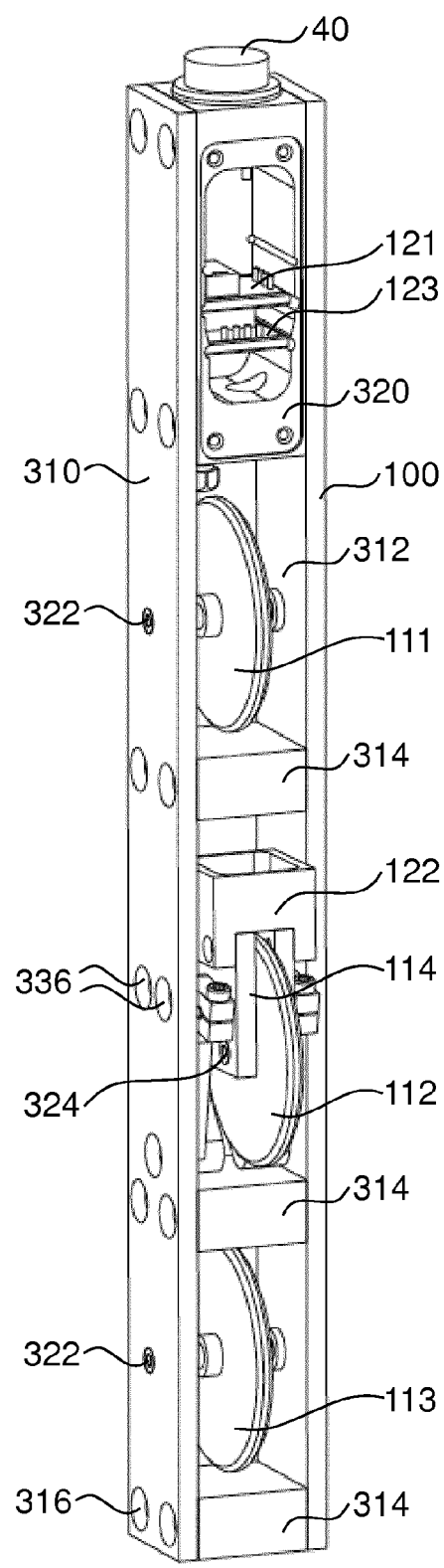
FIG. 11 illustrates a perspective view of an embodiment of the probe according to the invention.

FIG. 11 illustrates a prospective view of an embodiment of the probe 100 according to an embodiment of the invention. The perspective view comprises the element as a free hanging probe 100 at cable 40. The probe 100 comprises two side walls 310, 312 being connected with a plurality of webs 314. The webs 314 in this particular embodiment comprise holes 326 in direct alignment with corresponding holes in the side walls 310 and 312, wherein these elements are put together through screws 316, e.g. two screws 316 at each side of the web 314.

At the upper end of the probe 100 the two tilt sensors 121 and 123 are attached in a frame 320 which also comprises the attachment means for the cable 40. From the orientation of the electronic PCB of tilt sensors 121 and 123 can be seen that they are oriented to be adapted to measure the tilting angle in two horizontal planes one perpendicular to the other and both perpendicular to the longitudinal axis of the probe 100. Of course, it is also possible to provide these tilting sensors 121 and 123 at another place along the longitudinal access of the probe 100. Beyond these tilt sensors 121 and 123 and frame 320 is provided the first fixed wheel 111, which is attached on an axis extending in two corresponding bearings 322 in the side walls 310 and 312. The third wheel 113 is mounted in an equivalent way at the bottom of the device.

The only important relationship on the longitudinal axis of probe 100 is the arrangement of second wheel 112 between first wheel 111 and third wheel 113. Second wheel 112 is attached on a lever construction with bearing 324. On this lever 114 is also provided the second tilt sensor 122 and this lever construction is then attached to the two side walls 310 and 312.

It is noted, that the remaining sides of the probe 100 are completely open, although it would be possible to provide at least partial closing surfaces.

Figure 12:
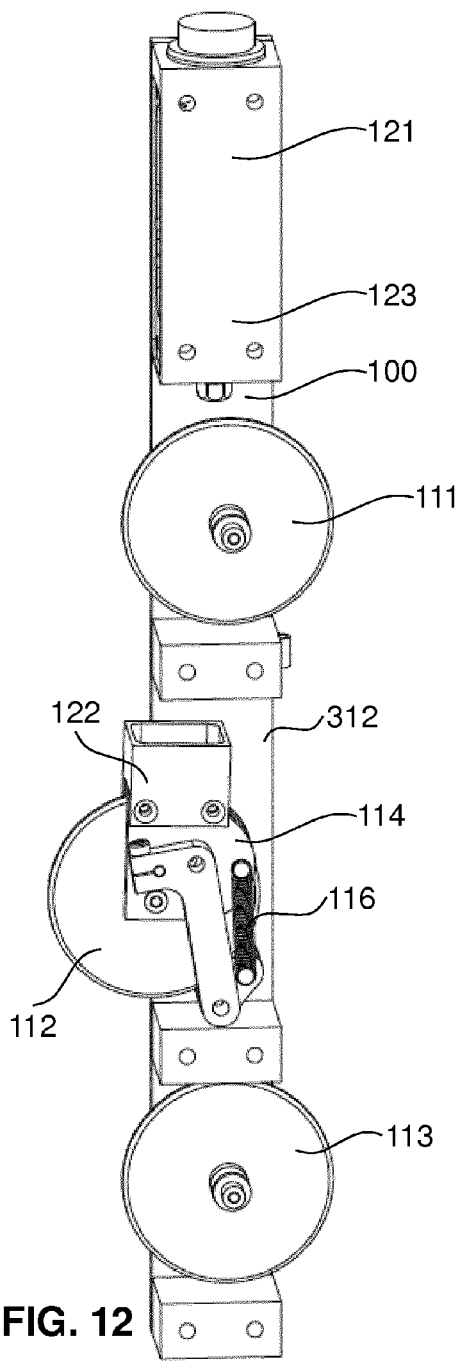
FIG. 12 illustrates a side view of the probe according to FIG. 11 without the front panel.
Figure 13:
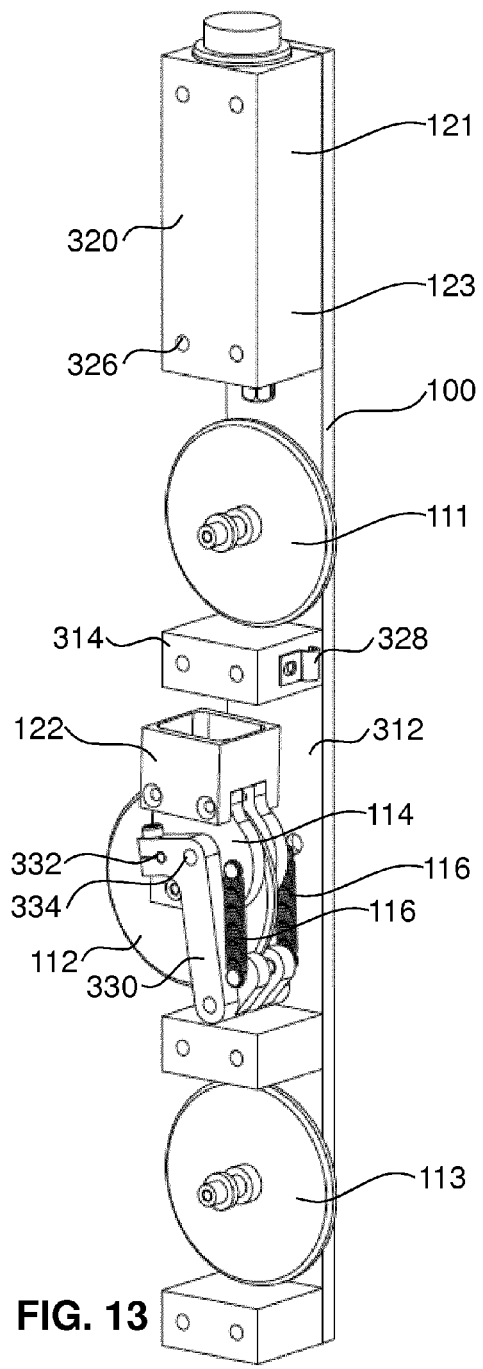
FIG. 13 illustrates a further perspective side view of the probe according to FIG. 11 without the front panel.

FIG. 12 and FIG. 13 show two different perspective and side views of the probe 100 according to FIG. 11 wherein the probes are shown without the front panel 310. Only the rear panel 312 is represented. On frame 320 the corresponding holes for fixation 326 are represented in the respective corners.

On an intermediate web 314 an attachment element 328 is provided for attaching the cable to the probe which is connecting the sensor on the lever 122 to the frame 320. Two L-shaped hangers 330 are provided on both sides of the middle single wheel 112, comprising the axle at point 332 to attach the turning lever element 114 with its bearings. Hole 334 and 335 shows the position where the L-shaped hangers 330 are attached to the side walls 312 and 314 by screws. The screw fixing the hanger in hole 334 can be fixed in two different holes 336 on the same height in the longitudinal direction of the probe in the side wall in order to switch the position of the center of rotation 332 of the lever 114 and hence the position of the middle wheel 112 in respect to the upper 111 and the lower wheel 113. This allows using the same probe for different type of inclinometer pipes with different inner diameters. Springs 116 are provided to allow a pretention on the second wheel 112 to be urged against the channel in the pipe 10.

Figure 14:
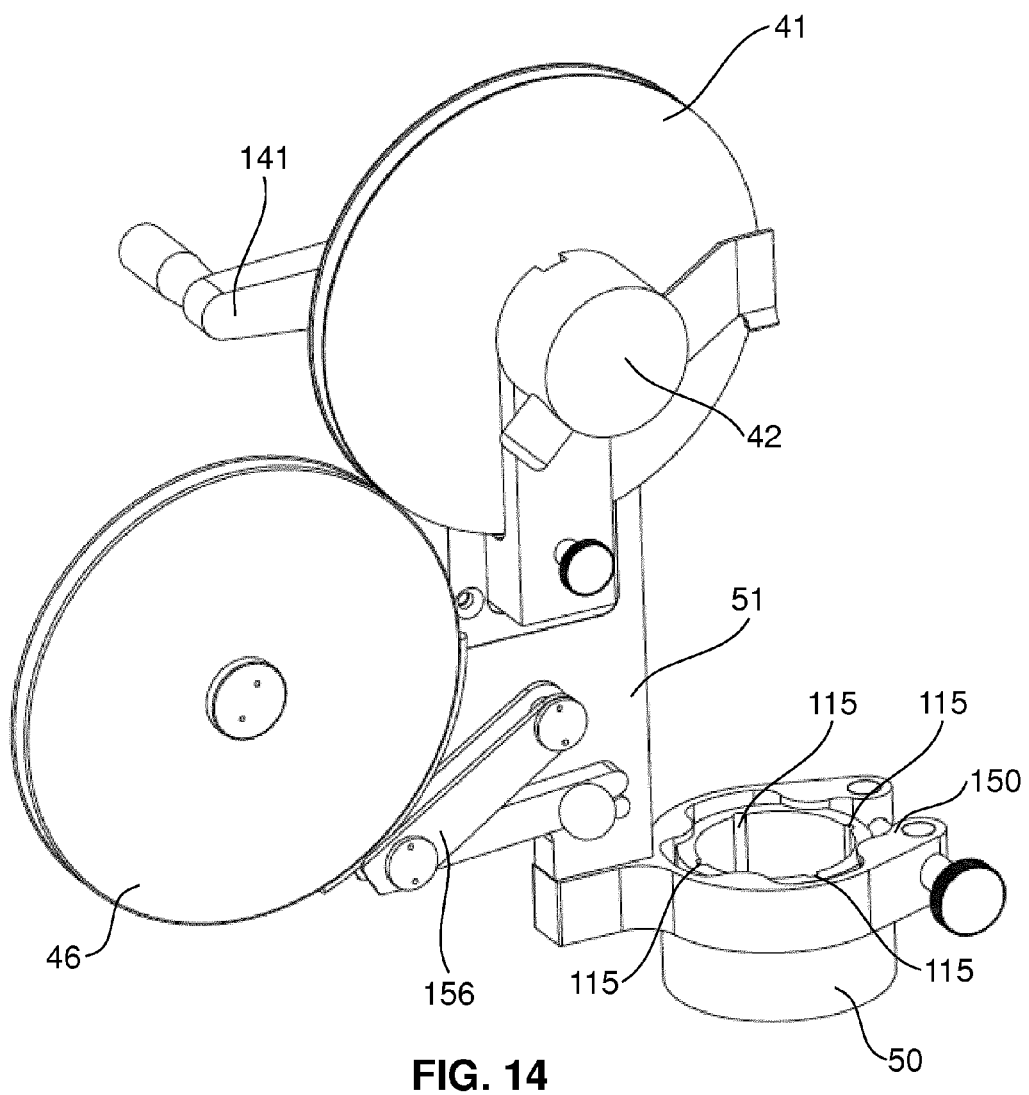
FIG. 14 illustrates a perspective view of an embodiment of the winch.

FIG. 14 shows an embodiment of the mechanical design of the winch 51 shown in a schematically way in FIG. 3. There it can be seen that the rotation sensor 42 is mounted on the axle of wheel 41. Crank 141 is provided to turn wheel 41. Wheel 41 is urged against wheel 46 by the load 49 of the cable 40 squeezing the cable in between. The device 156 is guiding the cable onto the wheel 46 when the probe is lowered; it can be shifted to insert and to remove the cable around the wheels. The winch 51 is fixed with a pipe clamp 150 to the connecting piece 50. The inner diameter of connecting piece 50 is structured as pipe 10 therefore, FIG. 14 shows the four U-shaped channels 115 in which the outer circumferential surfaces of wheels 111 to 113 are engaged.

Figure 16:
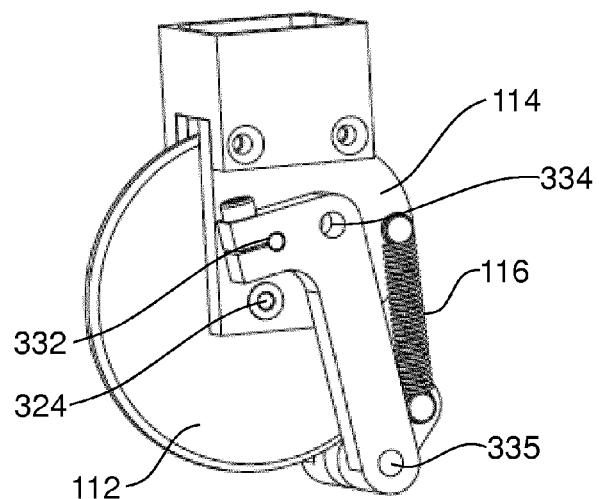
FIG. 16 illustrates a side view of the attachment elements for the middle wheel of the probe according to FIG. 11.
Figure 17:
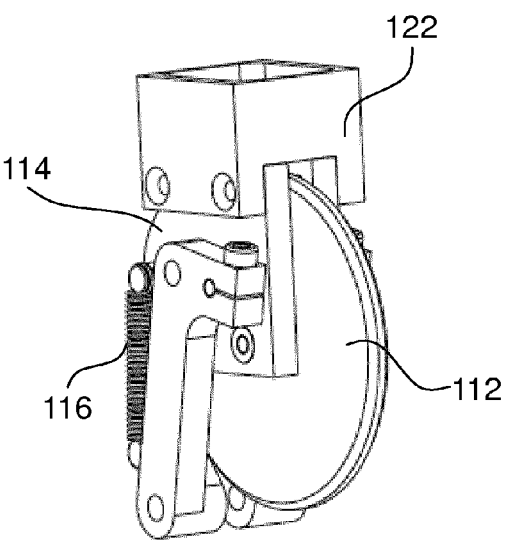
FIG. 17 illustrates a similar side view as FIG. 16 from a different perspective.

FIG. 16 and FIG. 17 illustrate two different side views of the attachment elements for the middle wheel 112 of the probe according to FIG. 11. The central element is lever 114, onto which the sensor 122 is fixedly attached; here represented as the enclosing frame.

Figure 15:
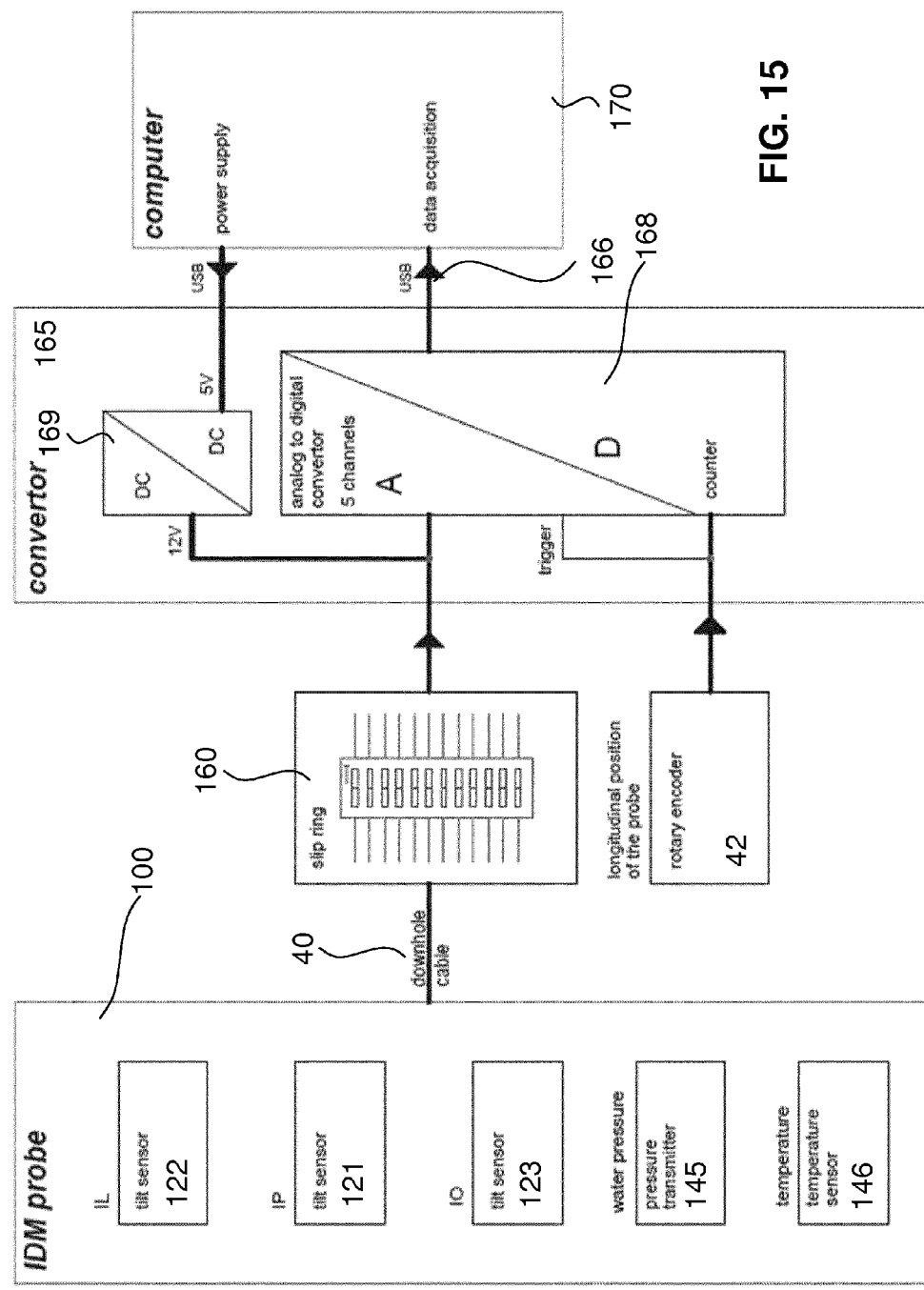
FIG. 15 illustrates a schematic view of the electronic components of an embodiment of the measurement apparatus.

Finally, FIG. 15 shows a schematic view of the electronic components of an embodiment of the measurement apparatus. On the left hand side the IDM probe 100 is represented with the three tilt sensors 122, 121 and 123. Furthermore, within probe 100 a water pressure sensor 145 is provided as well as a temperature sensor 146. These optional sensors 145 and 146 can be provided in the frame 320. The sensors provide additional information in the analysis of geotechnical problems. Furthermore, they allow for verification that the measurements take place under comparable environmental conditions.

The electrical signals are transmitted via the downhole cable 40 over a slip ring device 160. Each tilt sensor produces two analog signals between e.g. 0 and 5 volt voltage transferred by two separated wires. All the wires for the signal transfer and the two wires for the power supply go within the cable 40. At the top of the borehole the cable 40 goes around the winch 51 and is afterwards spooled on a reel. The slip ring device 160 is provided within the reel in order to transmit the signals and also the power supply from the rotating part of the reel to the stable part of the reel.

The signals are then transmitted to an A/D converter 165 and transmitted to an electronic processor 170 which can especially be a computer. The data transfer can be provided through a USB connection 166. It is possible that the converter receives his power from the computer 170 through a USB connection which may then be transformed in a DC/DC convertor 169 to provide e.g. a 12 volt voltage which is then transmitted to the slip ring 160 and the down hole cable for the different electronic components in the IDM probe 100.

As explained above, the rotation sensor 42 to distinguish the longitudinal position of the probe 100 in the pipe 10 is detected at winch 51 and transmitted to the counter of the A/D converter 168 in the converter device 165.

| REFERENCE SIGNS |
| --- |
| 10 pipe |
| 11 pipe without stress influence |
| 12 pipe under stress |
| 13 inner lumen/bore |
| 15 middle axis of pipe |
| 17 refill material |
| 18 pipe wall |
| 19 horizontal section |
| 20 pipe section |
| 21 pipe diameter |
| 22 pipe diameter |
| 25 joint area |
| 27 ground |
| 28 height position in pipe |
| 29 ground |
| 31 horizontal displacement |
| 32 lateral pressure |
| 40 cable |
| 41 wheel |
| 42 rotation sensor |
| 45 cable marker |
| 46 wheel |
| 47 cable movement direction |
| 49 direction of load through gravity |
| 50 connecting piece |
| 51 winch |
| 55 arrow indicating pivot movement |
| 56 arrows indicating squeezing |
| 100 probe |
| 101 round pipe section |
| 102 oval pipe section |
| 105 probe length |
| 106 section length |
| 111 upper wheel |
| 112 middle wheel |
| 113 lower wheel |
| 114 lever |
| 115 channel |
| 116 spring |
| 117 wheel connection line |
| 118 error in diameter measurement |
| 119 true inner diameter ID |
| 120 positioning system |
| 121 tilt sensor |
| 122 tilt sensor |
| 123 tilt sensor |
| 125 ignored area |
| 126 section of averaging |
| 131 long axis |
| 132 short axis |
| 135 diameter measurements |
| 141 crank |
| 145 water pressure sensor |
| 146 temperature sensor |
| 150 pipe clamp |
| 156 cable guidance |

-continued

| REFERENCE SIGNS |
| --- |
| 160 slip ring |
| 165 converter |
| 166 USB connection |
| 168 A/D converter |
| 169 DC/DC converter |
| 170 computer |
| 200 drilling a borehole |
| 205 installing a pipe |
| 210 measuring diameters |
| 215 correcting diameter readings |
| 220 deriving ovalization value |
| 225 obtention of required sets of measurements |
| 230 closing loop step for repetition |
| 235 deriving change in ovalization value |
| 240 correcting change in ovalization value |
| 245 averaging change in ovalization value |
| 250 assessing stiffness |
| 255 deriving change in pressure |
| 310 side wall |
| 312 side wall |
| 314 web |
| 320 frame |
| 322 bearing |
| 324 bearing |
| 326 fixation hole |
| 328 attachment element |
| 330 L-shaped hanger |
| 332 pivoting point |
| 334 hole |
| 335 axle hole |
| 336 hole |

The invention claimed is:

1. A method for measuring pressure exerted by earth material, comprising:
providing a pipe in the earth material, wherein the pipe has a longitudinal bore defining an inner diameter of the pipe, and wherein the pipe is an inclinometer pipe,
providing a device adapted to be moved within the pipe along the longitudinal bore, wherein the device comprises sensors adapted to sense the inner diameter of the pipe,
moving the device along the pipe,
taking a measurement of the inner diameter of the pipe in a first transversal direction at at least one predetermined longitudinal position of the pipe,
taking a measurement of the inner diameter of the pipe in a second transversal direction at the at least one predetermined longitudinal position of the pipe, wherein the second transversal direction is oriented differently to the first transversal direction, and
deriving an ovalization value of the pipe at the at least one predetermined longitudinal position of the pipe through subtracting the inner diameter measurement of the first transversal direction from the inner diameter measurement of the second transversal direction.

2. The method according to claim 1, wherein the first transversal direction is oriented perpendicular to the second transversal direction.

3. The method according to claim 1, wherein there are two or more further transversal directions oriented each in an angle to each other transversal direction.

4. The method according to claim 1, wherein the pipe is one hollow cylinder or a sequence of sections of hollow cylinders.

5. The method according to claim 1, wherein the pipe comprises two or more pairs of inside guiding channels for guiding the device.

6. A method for measuring pressure exerted by earth material, comprising:
 providing a pipe in the earth material, wherein the pipe has a longitudinal bore defining an inner diameter of the pipe,
 providing a device adapted to be moved within the pipe along the longitudinal bore, wherein the device comprises sensors adapted to sense the inner diameter of the pipe,
 moving the device along the pipe,
 taking a measurement of the inner diameter of the pipe in a first transversal direction at at least one predetermined longitudinal position of the pipe,
 taking a measurement of the inner diameter of the pipe in a second transversal direction at at least one predetermined longitudinal position of the pipe, wherein the second transversal direction is oriented differently to the first transversal direction, and
 deriving the ovalization of the pipe at that predetermined longitudinal position of the pipe through subtracting the diameter value of the first transversal direction from the diameter value of the second transversal direction,
 wherein the measurements of the inner diameter value at the different transversal directions are fitted to a theoretical oval of the pipe providing the best fit at a specific longitudinal position.

7. The method according to claim 6, wherein the ovalization value is corrected for an inclination of the pipe, wherein the device further comprises at least one inclination sensor to determine a specific inclination of the device and the pipe at any longitudinal position of the device.

8. The method according to claim 6, wherein the correcting of the ovalization value for inclination of the pipe is calibrated based on the inclination at a specific section of the pipe.

9. A method for measuring pressure exerted by earth material, comprising:
 providing a pipe in the earth material, wherein the pipe has a longitudinal bore defining an inner diameter of the pipe,
 providing a device adapted to be moved within the pipe along the longitudinal bore, wherein the device comprises sensors adapted to sense the inner diameter of the pipe,
 moving the device along the pipe,
 taking a measurement of the inner diameter of the pipe in a first transversal direction at at least one predetermined longitudinal position of the pipe,
 taking a measurement of the inner diameter of the pipe in a second transversal direction at at least one predetermined longitudinal position of the pipe, wherein the second transversal direction is oriented differently to the first transversal direction, and
 deriving the ovalization of the pipe at that predetermined longitudinal position of the pipe through subtracting the diameter value of the first transversal direction from the diameter value of the second transversal direction,
 wherein a value representing the change in lateral pressure CP, being defined as a major principle lateral stress increment in a surrounding ground, is derived from a change in ovalization value applying an analytical solution based on elasticity theory based on the formula:

$$CP = YG*(1+alpha)/(8*(1-SR)*\cos(2*DS))*COV$$

with $$alpha = 3YP*IP*(5-PG)/(RP^3*YG)$$

wherein YP is Young's modulus of the pipe and YG is Young's modulus of the surrounding ground, SR is the stress ratio in between the principle stress increments in a plane at infinity, COV is the change in ovalization value, PG is Poisson's ratio of the surrounding ground, RP is a mean radius of the pipe, IP is a circumferential cross-section moment of inertia of the pipe, DS is an angle between a direction of the major principle stress increment and a direction of a minor axis of an equivalent oval, wherein the stress ratio SR of the principle stress increments is defined by dividing a minor principle stress increment by the major principle stress increment, wherein, through assumption of constrained boundary conditions at infinity in direction of the minor principle stress increment, the stress ratio SR of principle stress increments is considered equal to the Poisson's ratio of the surrounding ground PG.

10. The method according to claim 9, wherein the angle DS obtained through measurement of a horizontal displacement of the surrounding ground HD based on an assumption that the major principle stress increment occurs in direction of the horizontal displacement of the surrounding ground HD.

11. A probe device for measuring pressure exerted by earth material around a pipe, comprising:
 a longitudinal frame comprising an attachment for a cable intended to displace the probe device within the pipe along a longitudinal bore of the pipe,
 at least a first sensor adapted to sense an inner diameter of the pipe in a first transversal direction at a predetermined longitudinal position of the pipe,
 at least a second sensor adapted to sense the inner diameter of the pipe in a second transversal direction, wherein the second transversal direction is oriented differently to the first transversal direction,
 at least one sensor adapted to determine a longitudinal position of the probe device in the pipe, and
 a control unit connected with the sensors,
 wherein the control unit is adapted to derive an ovalization value of the pipe at the at least one predetermined longitudinal position of the pipe through subtracting a diameter value of the first transversal direction from a diameter value of the second transversal direction.

12. A probe device for measuring pressure exerted by earth material around a pipe, comprising:
 a longitudinal frame comprising an attachment for a cable intended to displace the probe device within a pipe along its longitudinal bore,
 at least a sensor adapted to sense the inner diameter of the pipe,
 at least one sensor adapted to determine the longitudinal position of the probe device in the pipe, and
 a control unit connected with the sensors
 wherein the device is adapted to take a measurement of the inner diameter of the pipe in a first transversal direction at at least one predetermined longitudinal position of the pipe and to take a measurement of the inner diameter of the pipe in a second transversal direction at at least one predetermined longitudinal position of the pipe, wherein the second transversal direction is oriented differently to the first transversal direction, and wherein the control unit is adapted to derive the ovalization of the pipe at that predetermined longitudinal position of the pipe through subtracting the diameter value of the first transversal direction from the diameter value of the second transversal direction, wherein three wheels are provided along a longitudinal axis of the probe device and wherein an upper and a lower wheel are attached rotatably at the longitudinal frame of the probe device and which is connected to the cable and wherein a middle wheel is attached on a movable axis being parallel to an axis of the other two wheels.

13. A probe device for measuring pressure exerted by earth material around a pipe, comprising:
   a longitudinal frame comprising an attachment for a cable intended to displace the probe device within a pipe along its longitudinal bore,
   at least a sensor adapted to sense the inner diameter of the pipe,
   at least one sensor adapted to determine the longitudinal position of the probe device in the pipe, and
   a control unit connected with the sensors
   wherein the device is adapted to take a measurement of the inner diameter of the pipe in a first transversal direction at at least one predetermined longitudinal position of the pipe and to take a measurement of the inner diameter of the pipe in a second transversal direction at at least one predetermined longitudinal position of the pipe, wherein the second transversal direction is oriented differently to the first transversal direction, and wherein the control unit is adapted to derive the ovalization of the pipe at that predetermined longitudinal position of the pipe through subtracting the diameter value of the first transversal direction from the diameter value of the second transversal direction, wherein the at least one sensor sensing the inner diameter of the pipe is a tilt sensor and/or wherein the at least one sensor determining the longitudinal position of the probe device is a rotation sensor provided at a cable pulling wheel.

* * * * *